United States Patent
Suzuki et al.

(10) Patent No.: US 9,533,358 B2
(45) Date of Patent: Jan. 3, 2017

(54) MATERIAL TO BE WORKED IN FACE DRIVING AND METHOD FOR WORKING THE SAME

(71) Applicant: TOYOTA JIDOSHA KABUSHIKI KAISHA, Toyota-shi (JP)

(72) Inventors: Toshitaka Suzuki, Okazaki (JP); Teruki Kameda, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/734,293

(22) Filed: Jun. 9, 2015

(65) Prior Publication Data
US 2015/0352643 A1 Dec. 10, 2015

(30) Foreign Application Priority Data
Jun. 10, 2014 (JP) .................................. 2014-119793

(51) Int. Cl.
*B23B 33/00* (2006.01)
*B23Q 3/00* (2006.01)

(52) U.S. Cl.
CPC .......... *B23B 33/005* (2013.01); *B23B 2233/04* (2013.01); *Y10T 82/10* (2015.01); *Y10T 428/24479* (2015.01)

(58) Field of Classification Search
CPC ...... B23B 23/04; B23B 31/261; B23B 33/005; B27C 7/04; B23Q 3/12
See application file for complete search history.

(56) References Cited

U.S. PATENT DOCUMENTS

| | | | | |
|---|---|---|---|---|
| 527,064 A | * | 10/1894 | Johnson | B23B 33/00 142/53 |
| 758,881 A | * | 5/1904 | Yost | B27C 7/00 142/1 |
| 764,523 A | * | 7/1904 | Curtis | B27C 7/00 142/1 |
| 1,868,594 A | * | 7/1932 | Black | B23B 33/005 82/165 |
| 2,337,727 A | * | 12/1943 | Sandelin | B27C 7/04 142/53 |

(Continued)

FOREIGN PATENT DOCUMENTS

| DE | 1233697 B | * | 2/1967 | ........... B23B 33/005 |
|---|---|---|---|---|
| JP | 61-125703 | | 6/1986 | |

(Continued)

*Primary Examiner* — Will Fridie, Jr.
(74) *Attorney, Agent, or Firm* — Oblon, McClelland, Maier & Neustadt, L.L.P.

(57) ABSTRACT

Provided is a material to be worked in face driving, which can facilitate making a face driver hold the material and can prevent a slide in the rotating direction between the face driver and the material, and a method for working the material. The material is to be worked with one end surface thereof held by the face driver having a center pin and a plurality of driving claws arranged around the center pin. A center hole into which the center pin is fit is formed on the one end surface. A recess or a protrusion existing in every phase in a circumferential direction around the center hole is formed on the one end surface. The recess or the protrusion is arranged within an area of the one end surface in a radial direction of the one end surface, into which the driving claws are driven.

4 Claims, 14 Drawing Sheets

(56) References Cited

U.S. PATENT DOCUMENTS

| | | | | |
|---|---|---|---|---|
| 2,545,050 A | * | 3/1951 | Schurr | B23B 33/005 82/165 |
| 4,398,579 A | * | 8/1983 | Holdahl | B23B 23/02 142/53 |
| 5,205,080 A | * | 4/1993 | Ibe | B23B 23/02 269/21 |
| 5,243,885 A | * | 9/1993 | Lash | B23B 33/005 142/53 |
| 5,771,762 A | * | 6/1998 | Bissett | B23B 31/261 142/53 |
| 2012/0097000 A1 | | 4/2012 | Scheu | |

FOREIGN PATENT DOCUMENTS

| | | | |
|---|---|---|---|
| JP | 4-63610 | 2/1992 | |
| JP | 2000-33504 | 2/2000 | |
| JP | 2012-091316 | 5/2012 | |
| WO | WO 0176793 A1 * | 10/2001 | B23B 33/005 |

\* cited by examiner

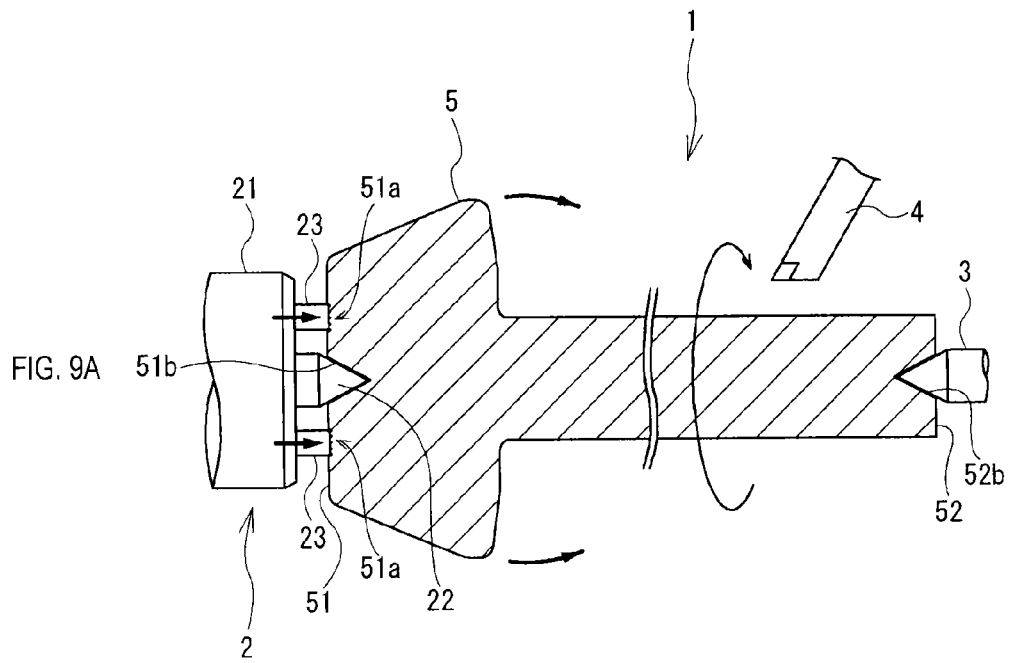
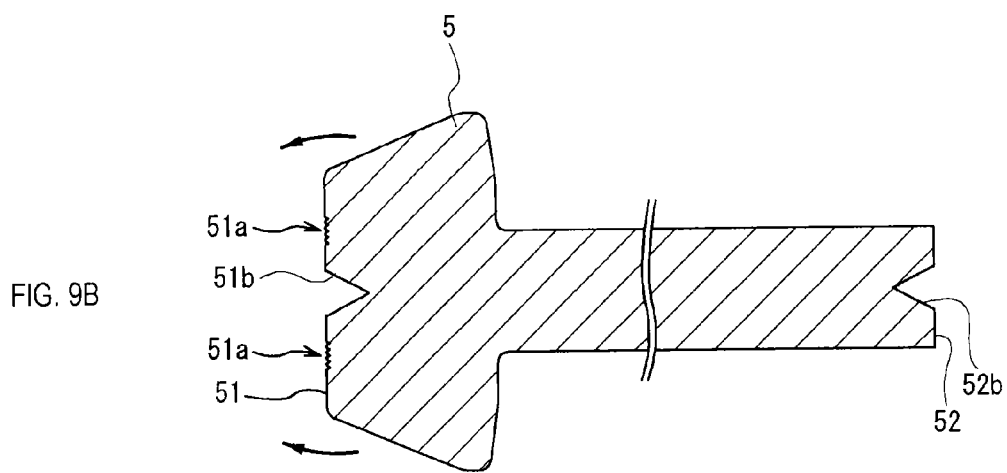

MATERIAL TO BE WORKED IN FACE DRIVING AND METHOD FOR WORKING THE SAME

TECHNICAL FIELD

The present invention relates to a material to be worked in face driving, in which one end surface thereof is held by a face driver and in which the outer circumferential surface thereof is turned while the material is rotated by the face driver, and a method for working the material.

BACKGROUND ART

Conventionally, face driving is known as a method for turning the outer circumferential surface of a material to be worked such as a shaft-shaped member. In the face driving, the outer circumferential surface of the material is turned while holding one end surface of the material in the axial direction thereof with a face driver and rotating the material with the face driver.

The face driver has a main body attached to a main spindle of a lathe or the like, a center pin protruding from the center of the main body, and a plurality of driving claws radially arranged around the center pin on the main body. The face driver holds the material by fitting the center pin into a center hole formed at the center part of the one end surface of the material and by driving the driving claws into the one end surface of the material.

The face driver integrally holds and rotates the material by making the driving claws bite into the one end surface of the material. However, if an amount of the bite of the driving claws into the one end surface of the material is small, a force of the face driver to hold the material may become less than a turning force applied to the material, which may cause a slide in the rotating direction between the face driver and the material.

In particular, if coining is performed on the one end surface of the material by cold forging or the like in order to form the center hole on the one end surface, the smoothness of the one end surface and the hardness of the material increase. As a result, the amount of the bite of the driving claws into the material becomes smaller, and the slide in the rotating direction between the face driver and the material becomes easy to occur, which may make it impossible to turn the material.

Accordingly, conventionally, as shown in JP-A 61-125703, impressions corresponding to driving claws of a face driver are formed, by pressing, on one end surface of a material to be worked, and then the driving claws are engaged with the impressions, thereby inhibiting a slide in the rotating direction between the face driver and the material.

SUMMARY OF INVENTION

Problem to be Solved by the Invention

However, for example, as shown in FIG. 19, if impressions 110a corresponding to driving claws 23 of a face driver are formed on one end surface 110 of a material 101 to be worked, making the face driver hold the material 101 is complicated because it is necessary that the driving claws 23 and the impressions 110a each radially arranged are made to coincide in phase in the circumferential direction with each other when making the face driver hold the material 101.

The objective of the present invention is to provide a material to be worked in face driving, which can facilitate making a face driver hold the material and can prevent a slide in the rotating direction between the face driver and the material, and a method for working the material.

Means for Solving the Problem

A first aspect of the invention is a material to be worked in face driving with one end surface of the material held by a face driver having a center pin and a plurality of driving claws arranged around the center pin, including: a center hole into which the center pin is fit, and which is formed on the one end surface; and a recess or a protrusion formed to exist in every phase in a circumferential direction around the center hole, which is formed on the one end surface. The recess or the protrusion is arranged within an area of the one end surface in a radial direction of the one end surface, into which the plurality of driving claws are driven.

Preferably, the recess or the protrusion is formed to be situated, in at least a phase in the circumferential direction of the one end surface, at a plurality of positions within the area in the radial direction, into which the plurality of driving claws are driven.

Preferably, the recess is a groove extending in a direction across the radial direction of the one end surface.

A second aspect of the invention is a method for working the above-mentioned material, including: holding the one end surface of the material with the face driver by fitting the center pin of the face driver into the center hole of the one end surface and by driving the plurality of driving claws of the face driver into the area of the one end surface; supporting the other end surface of the material with a supporting member; and turning an outer circumferential surface of the material while rotating the material on an axis of the center pin with the face driver.

Effects of the Invention

The present invention makes it possible to facilitate making a face driver hold a material to be worked and prevent a slide in the rotating direction between the face driver and the material.

BRIEF DESCRIPTION OF DRAWINGS

FIGS. 9A and 9B show how the material deforms elastically when the driving claws are driven into the one end surface of the material.

DESCRIPTION OF EMBODIMENTS

An embodiment according to the present invention will be described with reference to the attached drawings.

Figure 1:
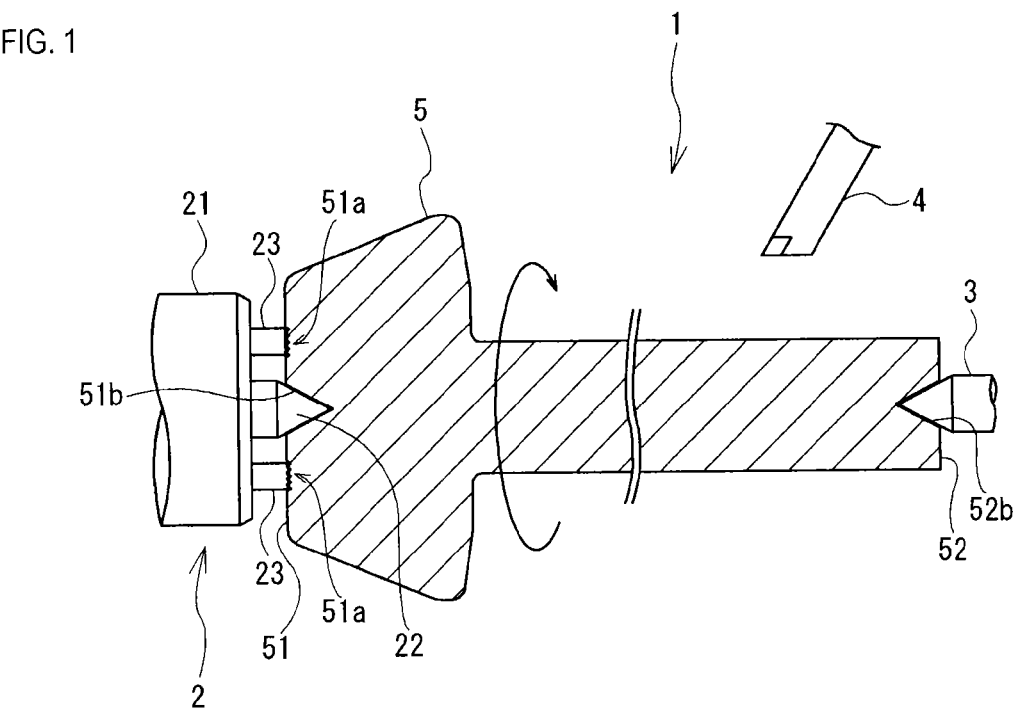
FIG. 1 is a sectional side view showing a material to be worked in face driving and a working device for working the material.

As shown in FIG. 1, a material 5 is an embodiment of a material to be worked in face driving according to the present invention, and is worked by a working device 1. The material 5 is formed in substantially a column.

Figure 2:
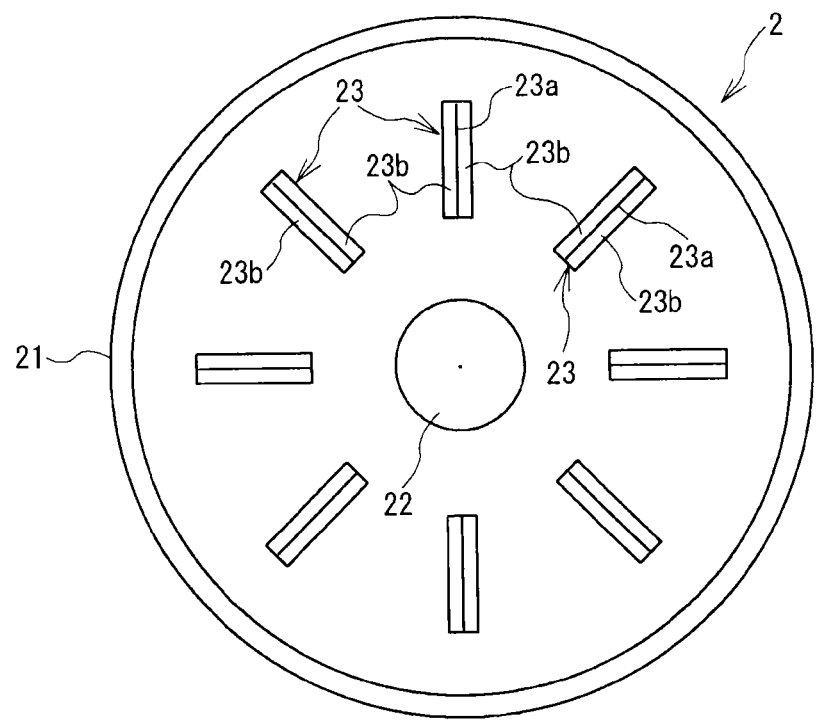
FIG. 2 is a front view of a face driver.

As shown in FIGS. 1 and 2, the working device 1 includes a face driver 2 which holds one end surface 51 of the material 5 in the axial direction thereof, a tailstock spindle 3 which supports the other end surface 52 of the material 5 in the axial direction thereof, and a tool bit 4 which is a cutting tool for turning the outer circumferential surface of the material 5.

The face driver 2 has a main body 21 attached to a main spindle of a lathe or the like, a center pin 22 protruding in the axial direction of the main body 21 from the axial center thereof, and a plurality of driving claws 23 radially arranged around the center pin 22 on the main body 21.

The main body 21 is rotated on the center pin 22 by the main spindle.

The center pin 22 is formed in a column, and the tip part thereof is formed in a circular cone whose diameter decreases toward the tip.

Each of the driving claws 23 is formed in a pillar, and the tip part thereof has a pair of tapered surfaces 23b coming close to each other toward the tip thereof. A linear claw part 23a is formed at the tip defined by the tapered surfaces 23b.

The plurality of driving claws 23 are arranged in the circumferential direction of a circle around the center pin 22, and the claw part 23a of each driving claw 23 extends in the radial direction of the circle. In other words, the plurality of driving claws 23 are attached to the main body 21 so that the claw parts 23a are radially arranged around the center pin 22.

Moreover, the driving claws 23 are configured to slide in the axial direction of the main body 21.

The tailstock spindle 3 is formed in a column, and the tip part thereof is formed in a circular cone whose diameter decreases toward the tip. The tailstock spindle 3 is attached to a tailstock or the like, and is configured to slide in the axial direction. The tailstock spindle 3 acts as a supporting member according to the present invention.

Figure 3:
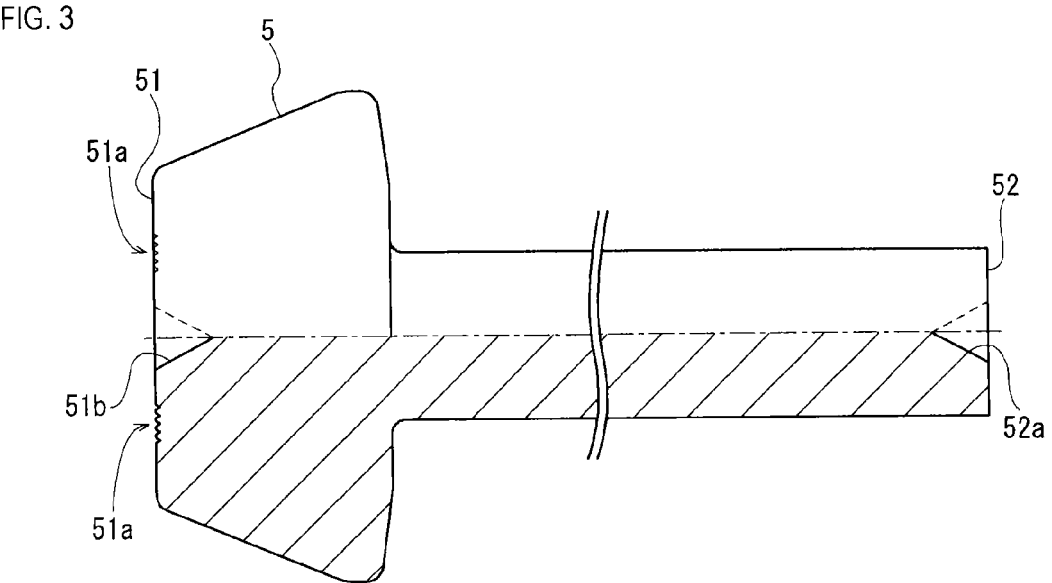
FIG. 3 is a side view, partly in section, of the material.
Figure 4:
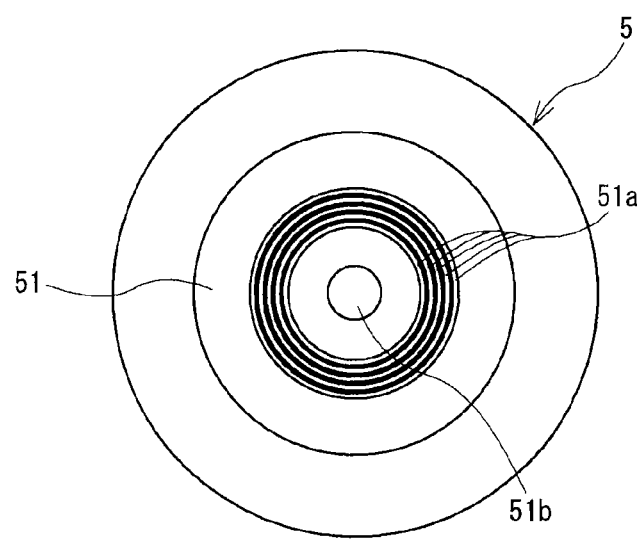
FIG. 4 shows one end surface of the material.

As shown in FIGS. 3 and 4, the material 5 is, for example, formed in a circular column in which the part on one side (left side in FIG. 3) in the axial direction thereof is larger in diameter than the part on the other side (right side in FIG. 3). In other words, the material 5 in the present embodiment has a large-diameter part situated on the one side in the axial direction thereof, and a small-diameter part formed continuously with the large-diameter part, which is situated on the other side in the axial direction.

The one end surface 51 of the material 5 in the axial direction thereof is formed as a flat surface, and a center hole 51b is formed at the center part of the end surface 51.

The center hole 51b is formed in the axial direction of the material 5, and is formed in a circular cone whose diameter decreases toward the depths of the material 5. The center hole 51b coincides in shape with the tip part of the center pin 22 in the face driver 2, and is configured so that the center pin 22 is fit thereinto.

A plurality of grooves 51a are formed around the center hole 51b on the end surface 51 of the material 5. The plurality of grooves 51a are a plurality of recesses formed on the end surface 51. The plurality of grooves 51a are formed in circular rings whose diameters differ from each other, and are concentrically arranged around the center hole 51b.

The other end surface 52 of the material 5 in the axial direction thereof is formed as a flat surface, and a center hole 52b is formed at the center part of the end surface 52.

The center hole 52b is formed in the axial direction of the material 5, and is formed in a circular cone whose diameter decreases toward the depths of the material 5. The center hole 52b coincides in shape with the tip part of the tailstock spindle 3, and is configured so that the tailstock spindle 3 is fit thereinto.

The material 5 configured as mentioned above is worked by the working device 1 as follows.

Figure 5:
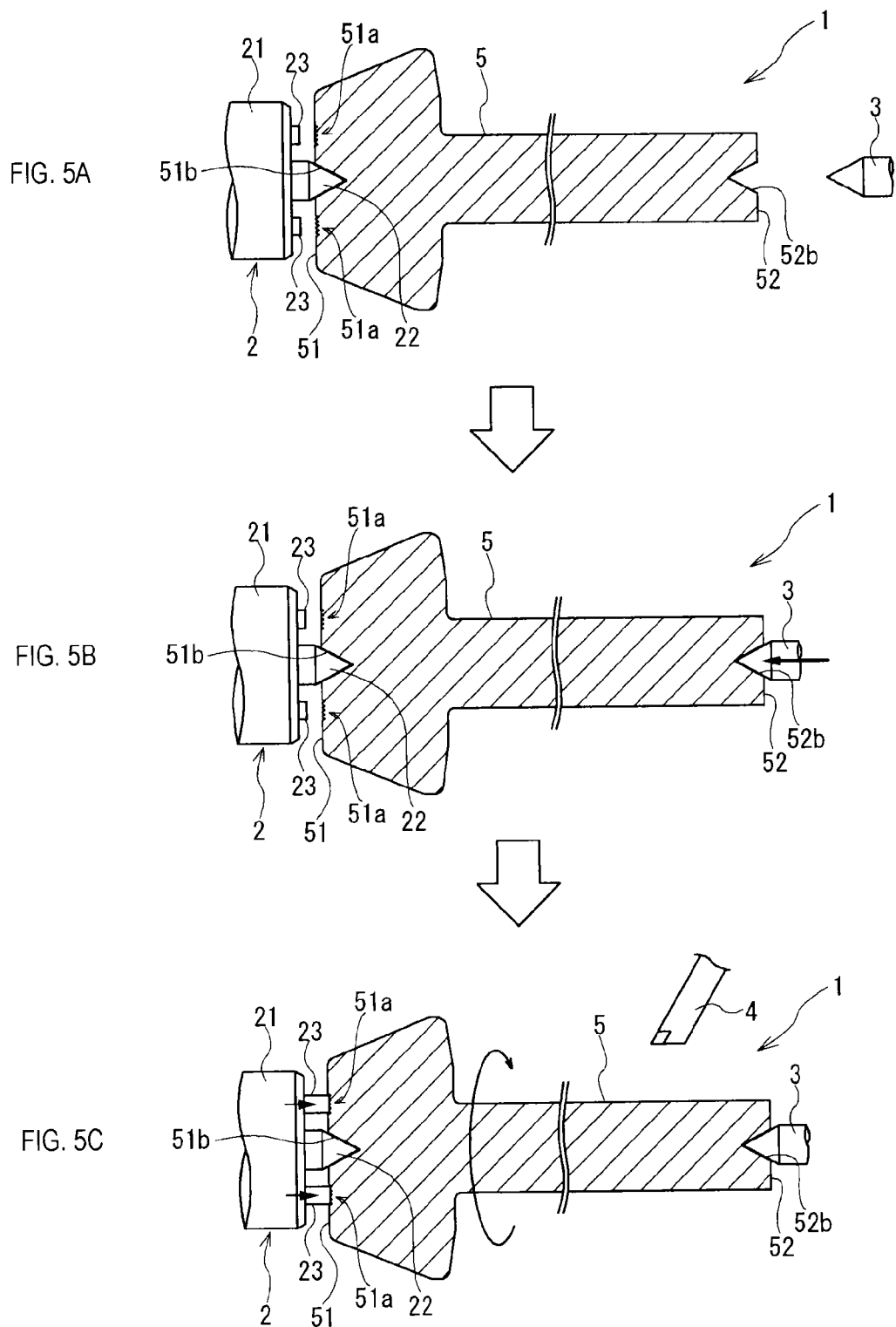
FIGS. 5A, 5B and 5C show a process for working the material with the working device.

First, as shown in FIG. 5A, the center pin 22 of the face driver 2 is fit into the center hole 51b of the material 5, and after that, as shown in FIG. 5B, the tailstock spindle 3 is slid toward the material 5 to fit the tailstock spindle 3 into the center hole 52b of the material 5.

Then, the driving claws 23 of the face driver 2 are slid in the direction in which the driving claws 23 protrude from the main body 21 to drive the driving claws 23 into the end surface 51 of the material 5, and thereby the driving claws 23 bite into the end surface 51.

The center pin 22 is fit into the center hole 51b and the driving claws 23 are driven into the end surface 51, thereby the end surface 51 of the material 5 held by the face driver 2. Further, the tailstock spindle 3 is fit into the center hole 52b of the material 5, thereby the end surface 52 of the material 5 supported by the tailstock spindle 3.

In this manner, the end surface 51 of the material 5 is held by the face driver 2, and the end surface 52 of the material 5 is supported by the tailstock spindle 3. In this state, as shown in FIG. 5C, the face driver 2 is rotated on the center pin 22, thereby the material 5 rotating on the axis thereof.

Moreover, the outer circumferential surface of the rotating material 5 is turned by the tool bit 4.

As mentioned previously, when the material 5 is rotated by the face driver 2, resistance in the rotating direction is applied between the face driver 2 and the end surface 51 of the material 5 by driving the driving claws 23 into the end surface 51 of the material 5. Consequently, the face driver 2 and the material 5 rotate integrally.

However, if an amount of the bite of the driving claws 23 into the end surface 51 is small, during the turning process with the tool bit 4, resistance between the tool bit 4 and the material 5 (cutting resistance) causes a slide in the rotating direction between the face driver 2 and the material 5, which may make it impossible to suitably turn the material 5.

Accordingly, in the material 5, the amount of the bite of the driving claws 23 into the end surface 51 is secured by forming the plurality of grooves 51a on the end surface 51, thus enabling to prevent the slide in the rotating direction between the face driver 2 and the material 5 during the turning process with the tool bit 4.

The structure of the end surface 51 of the material 5 will be described in detail.

Figure 6:
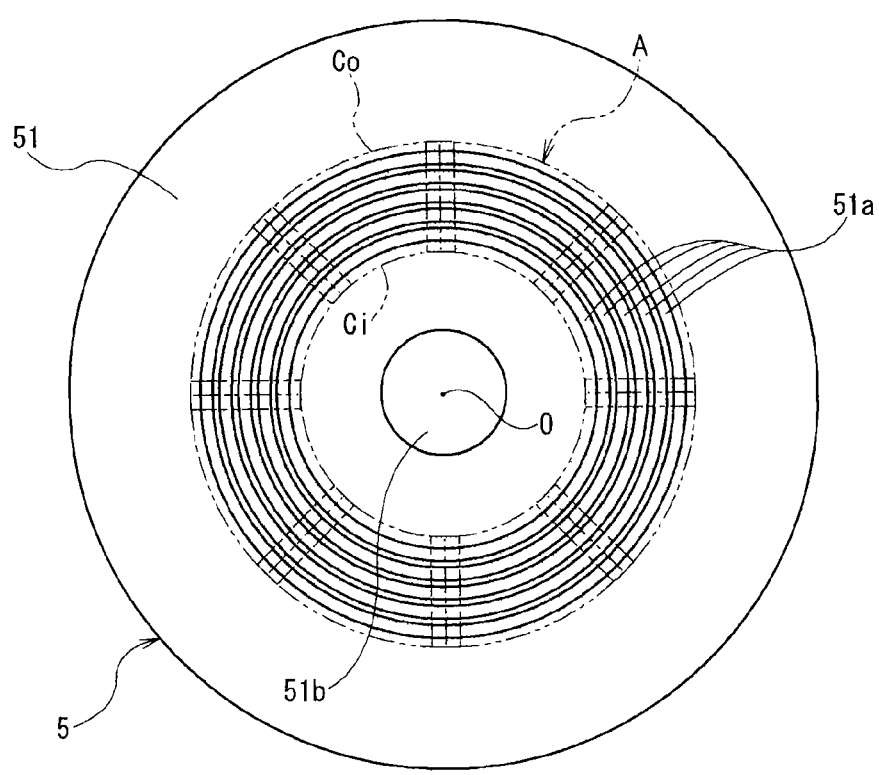
FIG. 6 shows an area in the one end surface of the material, where grooves are formed.

As shown in FIG. 6, on the end surface 51 of the material 5, the center hole 51b is formed at the center part thereof, and the grooves 51a are formed around the center hole 51b.

In the end surface 51, an area where the driving claws 23 are driven when the material 5 is held by the face driver 2 is defined as a holding area A. The holding area A is an annular area (see the shaded area in FIG. 6) surrounded by an inner circle Ci whose radius is the distance from a center O of the end surface 51 (i.e. the center of the center hole 51b) to the inner circumferential ends of the driving claws 23 driven into the end surface 51, and an outer circle Co whose radius is the distance from the center O of the end surface 51 to the outer circumferential ends of the driving claws 23 driven into the end surface 51.

On the end surface 51, the grooves 51a are formed within the holding area A. In other words, the grooves 51a are arranged within an area of the end surface 51 in the radial direction, into which the driving claws 23 are driven.

The grooves 51a formed in circular rings are formed to exist in every phase in the circumferential direction of the end surface 51.

The grooves 51a extend in a direction perpendicular to the radial direction of the end surface 51.

Therefore, when the driving claws 23 are driven into the end surface 51 in order to hold the end surface 51 of the material 5 with the face driver 2, the claw parts 23a of the driving claws 23 cross the plurality of grooves 51a.

Figure 7A:
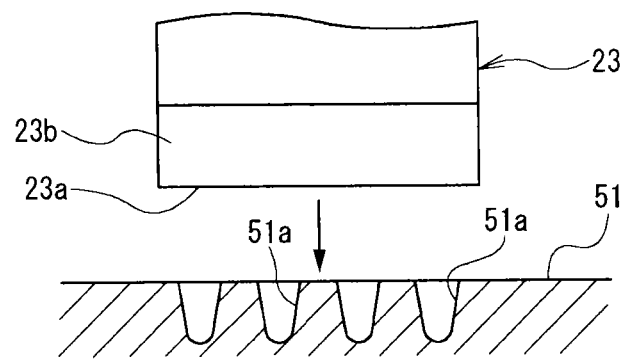
FIGS. 7A, 7B and 7C show how the material flows when driving claws are driven into the one end surface on which a plurality of grooves each in the shape of a circular ring are formed.

In other words, as shown in FIG. 7A, when the driving claws 23 are moved into proximity with the end surface 51 to be driven into the end surface 51, the claw parts 23a come in contact with a part of the end surface 51 where the grooves 51a are formed, and bite into the part of the end surface 51.

Figure 7B:
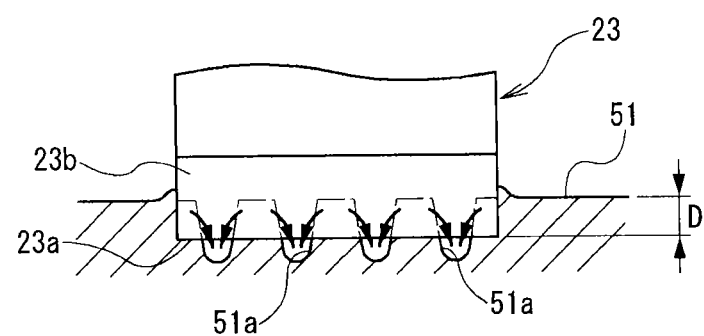
Figure 7C:
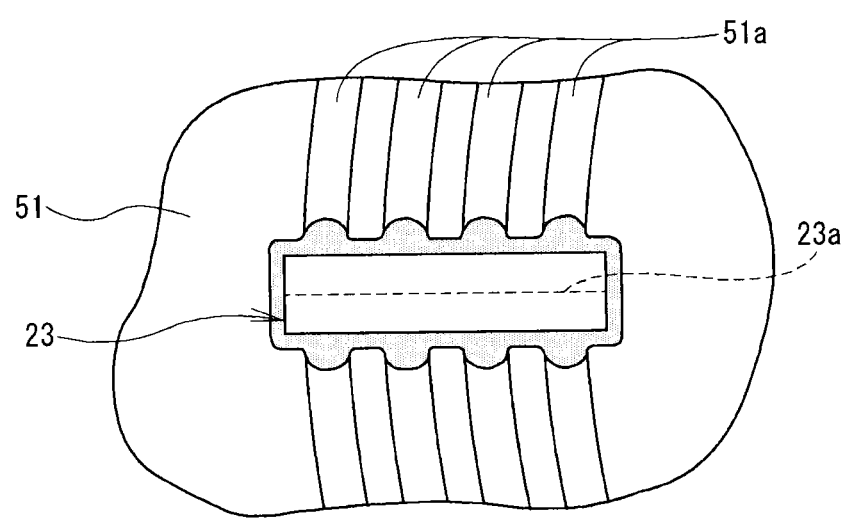

As shown in FIGS. 7B and 7C, while the driving claws 23 driven into the end surface 51 are biting into the end surface 51 by pressing, parts of the end surface 51 of the material 5, with which the driving claws 23 come in contact flow into the grooves 51a adjacent to the parts (see the arrows in FIG. 7B).

Since the parts of the material 5 which come in contact with the driving claws 23 flow into the grooves 51a adjacent to the parts, the parts move a short distance, and easily flow even at a small pressing load. This makes it possible to increase a depth D of the bite of the driving claws 23 into the end surface 51.

Therefore, the resistance in the rotating direction applied between the driving claws 23 and the end surface 51 can be increased to prevent the slide in the rotating direction between the face driver 2 and the material 5.

Moreover, since the grooves 51a are formed in the direction perpendicular to the radial directions of the end surface 51 which are the extending directions of the claw parts 23a of the driving claws 23, the material 5 efficiently flows into the grooves 51a. This makes it possible to make the depth D of the bite of the driving claws 23 into the end surface 51 larger at a small pressing load.

In contrast, as shown in FIG. 6, in order to drive the driving claws 23 into the end surface 51 formed as a plane surface where the grooves 51a are not formed in the holding area A, it is necessary to make parts of the material 5 coming in contact with the driving claws 23 flow to the respective outer edges of the driving claws 23.

Figure 8A:
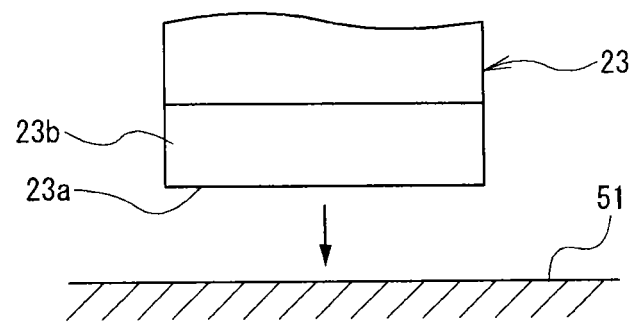
FIGS. 8A, 8B and 8C show how the material flows when the driving claws are driven into the one end surface formed as a plane surface on which no grooves are formed.
Figure 8B:
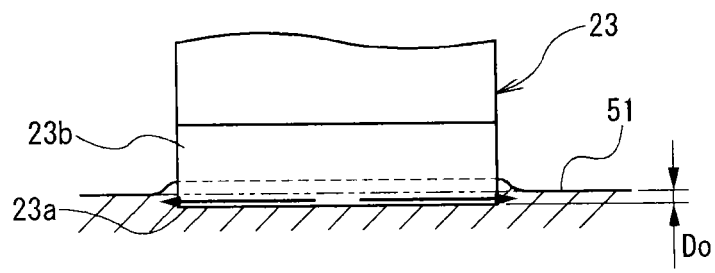
Figure 8C:
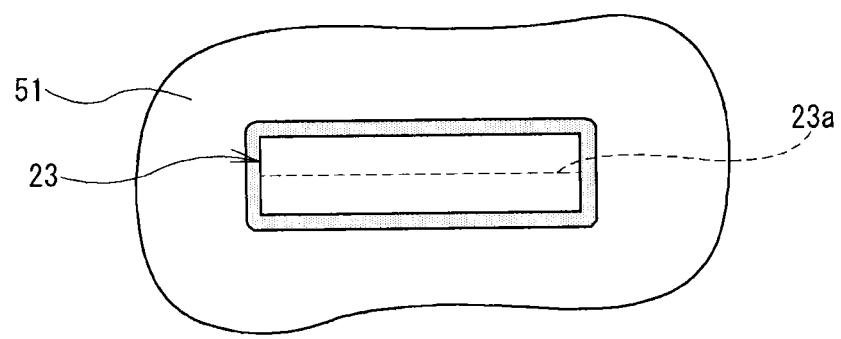

As shown in FIGS. 8B and 8C, if all the parts of the material 5 coming in contact with the driving claws 23 are made to flow to the respective outer edges of the driving claws 23, the parts of the material 5 flow a long distance (see the arrows in FIG. 8B). Therefore, if the driving claws 23 are, for example, driven into the end surface 51 at the pressing load equal to that for the case of forming the grooves 51a, a depth Do of the bite of the driving claws 23 into the end surface 51 is small. Moreover, in order to obtain the sufficient depth Do, it is necessary to make the pressing load of the driving claws 23 to the end surface 51 large.

As shown in FIG. 9A, in the material 5 being turned by driving the driving claws 23 into the end surface 51, the outer circumferential part of the large-diameter part of the material 5, for example, elastically deforms toward the small-diameter part by the pressing load of the driving claws 23 to the end surface 51.

On the other hand, as shown in FIG. 9B, in the worked material 5 which is released from the pressing load of the driving claws 23, the part of the large-diameter part which elastically deforms toward the small-diameter part returns to the original shape thereof by elastic recovery.

Thus, the material 5 is turned in the condition of elastically deforming by the pressing load, and returns to the original shape thereof by elastic recovery after being worked. Therefore, it is undesirable because a large pressing load of the driving claws 23 during the working leads to deterioration of working precision.

However, in the material 5 in the present embodiment, forming the grooves 51a on the end surface 51 makes it possible to secure the depth D of the bite of the driving claws 23 into the end surface 51 at a small pressing load. Therefore, the material 5 can reliably be rotated by the face driver 2, and an amount of elastic deformation of the material 5 during the working can be minimized. This makes it possible to improve precision in the working of the material 5.

Moreover, the grooves 51a are formed to exist in every phase in the circumferential direction of the end surface 51 in the holding area A. Therefore, if the driving claws 23 come in contact with the end surface 51 in any phase, the driving claws 23 certainly come in contact with the grooves 51a.

In other words, when the driving claws 23 are driven into the end surface 51 of the end surface 51, it is possible to facilitate making the face driver 2 hold the material 5 without making the driving claws 23 and the end surface 51 coincide in phase in the circumferential direction with each other.

Figure 10:
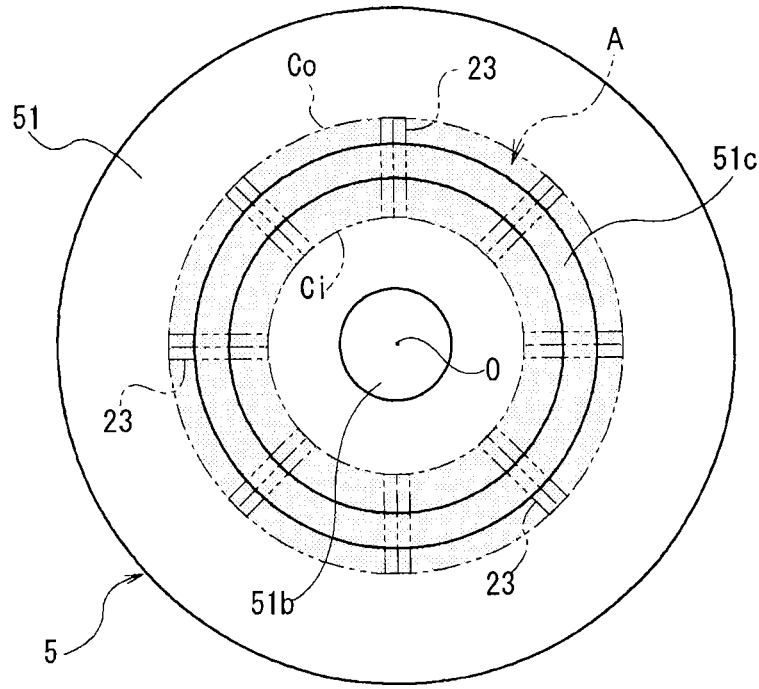
FIG. 10 shows the one end surface on which one groove in the shape of a circular ring is formed.

In the present embodiment, the plurality of grooves 51a are formed within the holding area A of the end surface 51 of the material 5. However, as shown in FIG. 10, when the driving claws 23 are driven into the end surface 51 of the end surface 51, the depth D of the bite of the driving claws 23 into the end surface 51 can also be secured by forming one groove 51c formed in a circular ring within the holding area A.

Figure 11:
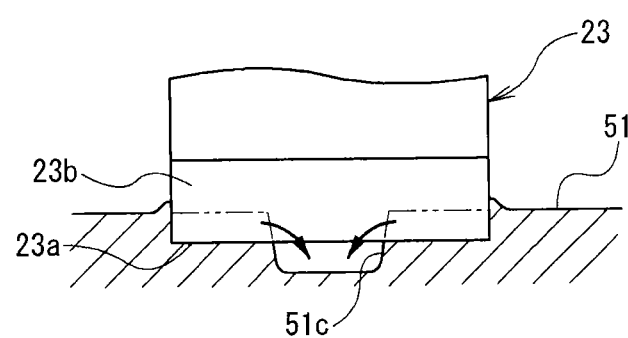
FIG. 11 shows how the material flows when the driving claws are driven into the one end surface on which the one groove in the shape of a circular ring is formed.

Specifically, as shown in FIG. 11, if the groove 51c is formed within the holding area A, the groove 51c is situated within an area where the driving claws 23 come in contact with the end surface 51. As a result, a part of the material 5 in the end surface 51, which comes in contact with the driving claws 23 can flow into the groove 51c. This makes it possible to shorten a distance that the material 5 flows when the driving claws 23 bite into the end surface 51, and consequently to sufficiently secure the depth D even at a small pressing load, thus enabling to prevent the slide in the rotating direction between the face driver 2 and the material 5.

Thus, in the holding area A of the end surface 51, not only in the case of forming the plurality of grooves 51a in the radial direction but also in the case of forming one groove 51c in the radial direction, the slide in the rotating direction between the face driver 2 and the material 5 can be prevented.

Figure 12:
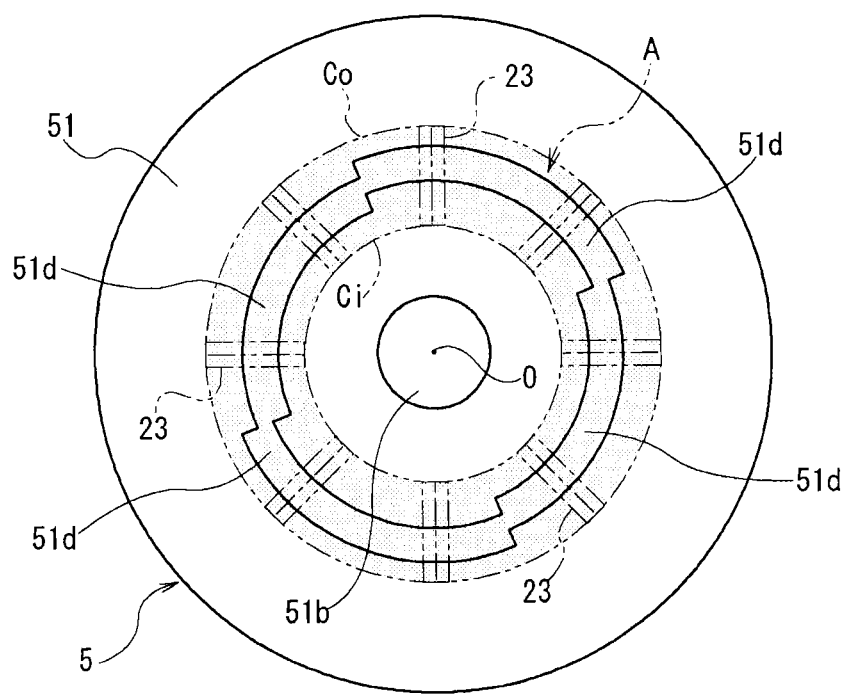
FIG. 12 shows the one end surface on which arc-shaped grooves with radial widths changed for each predetermined range in the circumferential direction are formed.

In the case of forming one groove 51c in the radial direction, it is unnecessary to make every radial width of the groove equal. For example, as shown in FIG. 12, grooves 51d with radial widths changed for each predetermined range in the circumferential direction may be formed.

Specifically, the grooves 51d may be formed in circular arcs, and may be arranged within the area of the end surface 51 in the radial direction, into which the driving claws 23 are driven (within the holding area A) so as to exist in every phase in the circumferential direction.

Figure 13A:
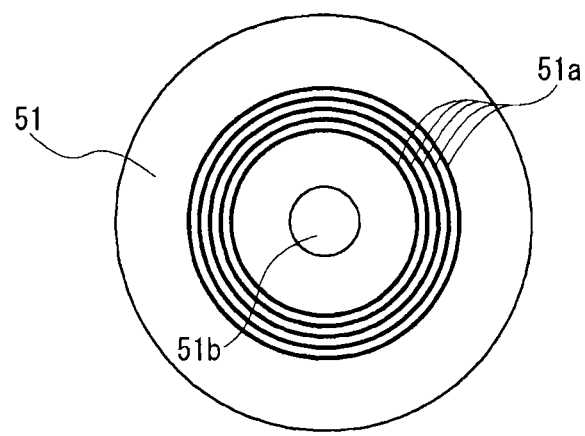
FIG. 13A shows the one end surface on which the plurality of grooves each in the shape of a circular ring are formed.
Figure 13B:
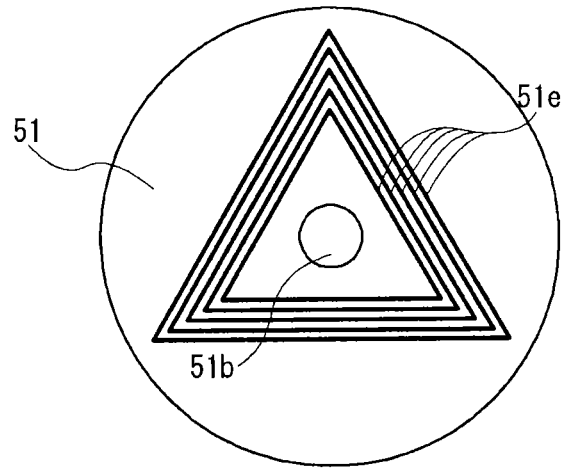
FIG. 13B shows the one end surface on which a plurality of grooves each in the shape of a triangular ring are formed.
Figure 13C:
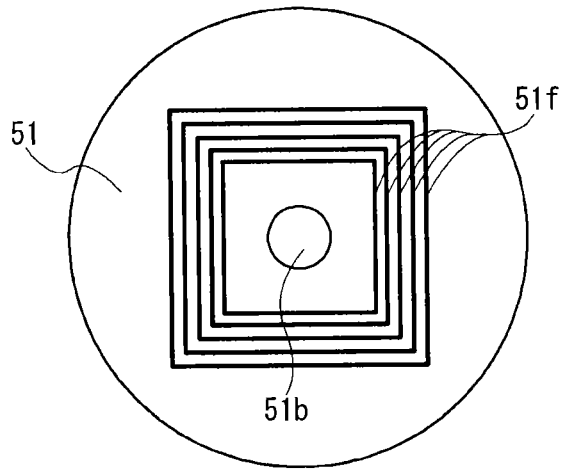
FIG. 13C shows the one end surface on which a plurality of grooves each in the shape of a quadrangular ring are formed.

In the case of forming a plurality of grooves in the radial direction within the holding area A of the end surface 51, instead of forming the grooves 51a formed in circular rings having different diameters from each other as shown in FIG. 13A, grooves 51e formed in triangular rings having different sizes from each other may be formed as shown in FIG. 13B. In addition, as shown in FIG. 13C, grooves 51f formed in quadrangular rings having different sizes from each other may be formed. Similarly, other polygonal grooves may be formed.

Figure 14:
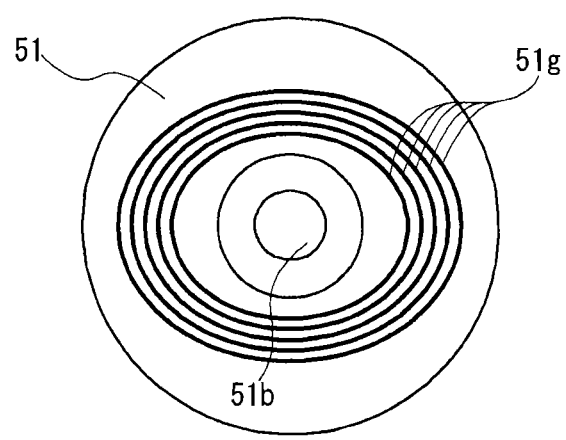
FIG. 14 shows the one end surface on which a plurality of grooves each in the shape of an elliptical ring are formed.

Moreover, as shown in FIG. 14, grooves 51g formed in elliptical rings having different diameters from each other may be formed.

Since the grooves 51a formed in circular rings extend in the direction perpendicular to the radial direction of the end surface 51 (direction along a radius from the center of the center hole 51b) in every phase in the circumferential direction, the parts of the material 5 in the end surface 51 flow into the grooves 51a the most efficiently. Therefore, it is preferable to form the grooves 51a formed in circular rings.

On the other hand, the grooves 51e formed in triangular rings and the grooves 51f formed in quadrangular rings each have parts extending in the direction perpendicular to the radial direction and the parts not extending in the direction perpendicular to the radial direction in some phases. However, even the parts not extending in the direction perpendicular to the radial direction extend in a direction across the radial direction. Therefore, when the driving claws 23 come in contact with the end surface 51, the parts of the material 5 in the end surface 51 flow into the grooves 51e or the grooves 51f. This makes it possible to increase the depth D even at a small pressing load, and consequently to prevent the slide in the rotating direction between the face driver 2 and the material 5.

Figure 15A:
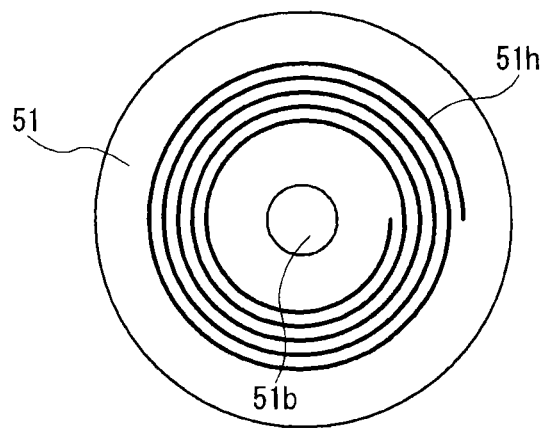
FIG. 15A shows the one end surface on which a groove in the shape of a circular spiral is formed.

Moreover, as shown in FIG. 15A, a groove 51h in the shape of a circular spiral may be formed on the end surface 51. In the case of forming the spiral groove 51h, the groove 51h in itself is one groove, but in any phase in the circumferential direction within the holding area A, the groove 51h exists at each of a plurality of positions in the radial direction. Therefore, the groove 51h comes in contact with a plurality of parts of each driving claw 23.

Figure 15B:
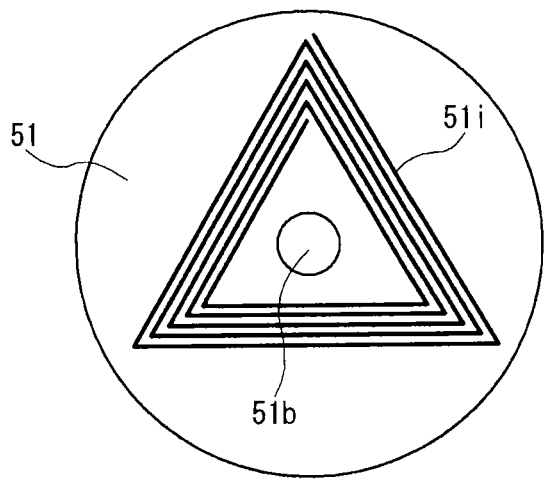
FIG. 15B shows the one end surface on which a groove in the shape of a triangular spiral is formed.
Figure 15C:
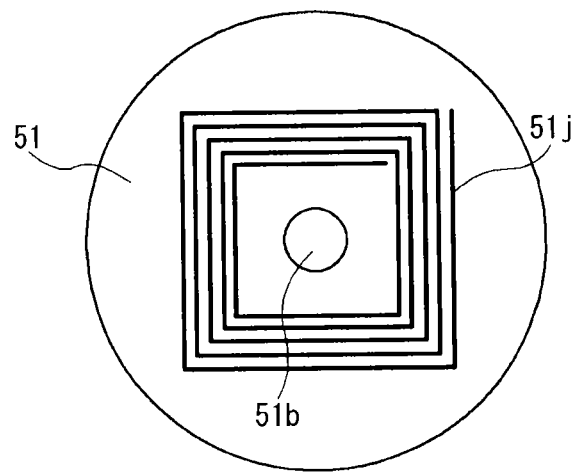
FIG. 15C shows the one end surface on which a groove in the shape of a quadrangular spiral is formed.

Similarly, on the end surface 51, a groove 51i in the shape of a triangular spiral may be formed as shown in FIG. 15B or a groove 51j in the shape of a quadrangular spiral may be formed as shown in FIG. 15C. Moreover, other groove in the shape of a polygonal spiral may be formed.

Figure 16:
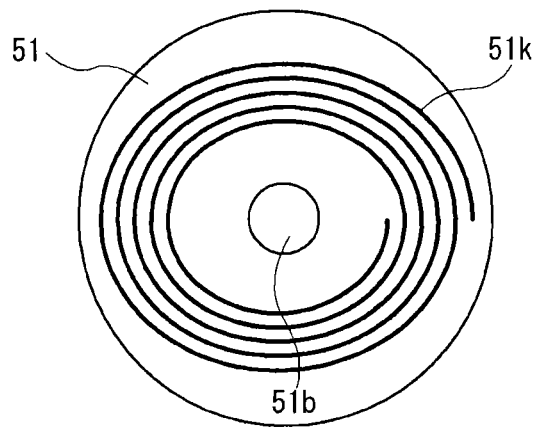
FIG. 16 shows the one end surface on which a groove in the shape of an elliptical spiral is formed.

Furthermore, as shown in FIG. 16, a groove 51k in the shape of an elliptical spiral may be formed.

Figure 17:
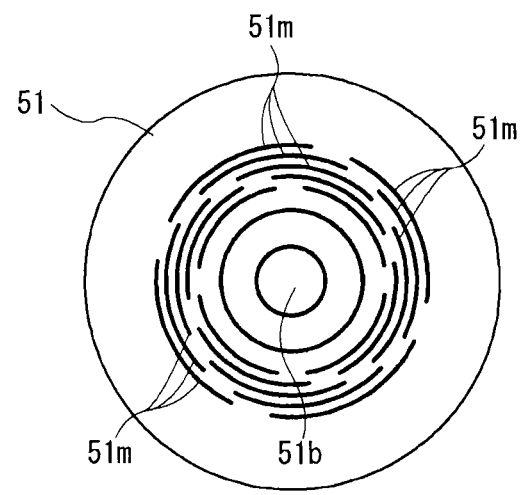
FIG. 17 shows the one end surface on which a plurality of arc-shaped grooves are formed.
Figure 18:
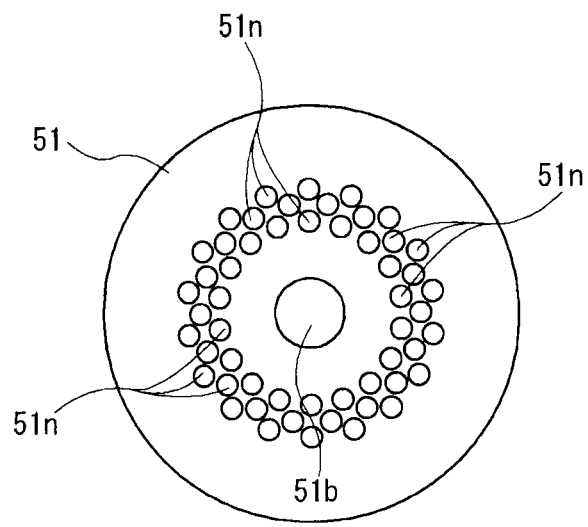
FIG. 18 shows the one end surface on which a plurality of circular holes are formed.
Figure 19:
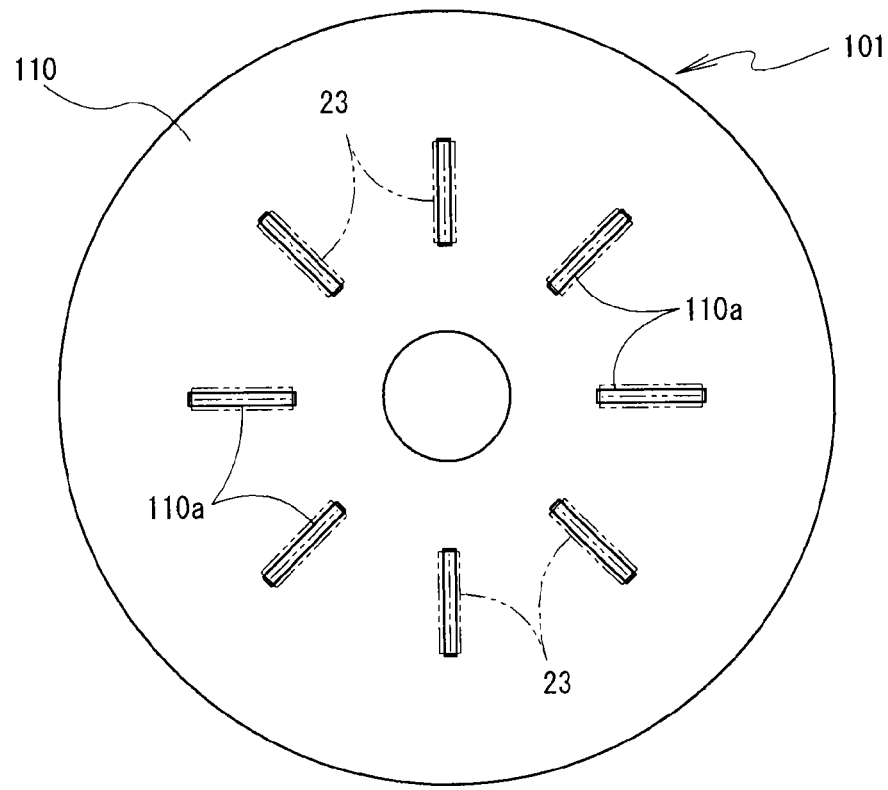
FIG. 19 shows the one end surface on which a plurality of impressions corresponding to the driving claws of the face driver are formed.

Moreover, as shown in FIG. 17, a plurality of arc-shaped grooves 51m may be formed on the end surface 51. In this case, for example, several grooves 51m having same diameter are arranged at predetermined intervals in the circumferential direction to form an arc group, and a plurality of arc groups having different diameters from each other are arranged in different phases in the circumferential direction. Therefore, a plurality of grooves can be situated in the radial direction within the holding area A of the end surface 51.

The previously-mentioned groove 51a, groove 51c and grooves 51d to 51m each extend in a direction across the radial direction of the end surface 51. However, as the recesses formed on the end surface 51, holes 51n may be adopted.

The holes 51n are circular holes, and are arranged at different positions in the radial and circumferential directions within the holding area A. In this case, the holes 51n are arranged at a plurality of positions in the radial direction in at least a phase in the circumferential direction.

The holes 51n are arranged as mentioned above, thus enabling to increase the depth D of the bite of the driving claws 23 into the end surface 51 even at a small pressing load, and consequently to prevent the slide in the rotating direction between the face driver 2 and the material 5.

In the previously-mentioned groove 51a and groove 51c, the driving claws 23 come in contact therewith in the same areas thereof in the radial direction even when the driving claws 23 come in contact with the end surface 51 in any phase in the circumferential direction. However, in the grooves 51d to 51m formed in a spiral, an elliptical ring, a polygonal ring and an arc whose diameter varies depending on the phase in the circumferential direction, and the holes 51n arranged at different positions in the radial and circumferential directions, the areas thereof in the radial direction, where the driving claws 23 come in contact therewith vary depending on the phase where the driving claws 23 come in contact with the end surface 51.

In other words, the area, in the radial direction, of each of the grooves 51d to 51m and the holes 51n, where the driving claws 23 come in contact therewith varies every time the material 5 is held by the face driver 2.

Therefore, in the case of forming the grooves 51d to 51m and the holes 51n on the end surface 51, the same parts of the driving claws 23 are not worn intensively compared with the case of forming the groove 51a or the groove 51c on the end surface 51, thus enabling to lengthen lives of the driving claws 23.

In the present embodiment, recesses such as the groove 51a, the groove 51c, the grooves 51d to 51m or the holes 51n are formed on the end surface 51 of the material 5. However, protrusions protruding from the end surface 51, which have the same shape (e.g. ring, spiral, or arc) as the groove 51*a*, the groove 51*c*, the grooves 51*d* to 51*m* or the holes 51*n* may be formed on the end surface 51 of the material 5.

In the case of forming the protrusions on the end surface 51 of the material 5 in this manner, similarly to the case of forming the recesses, the depth of the bite of the driving claws 23 into the end surface 51 is increased even at a small pressing load, thus enabling to prevent the slide in the rotating direction between the face driver 2 and the material 5.

REFERENCE SIGNS LIST

- 1: working device
- 2: face driver
- 3: tailstock spindle
- 4: tool bit
- 5: material to be worked
- 21: main body
- 22: center pin
- 23: driving claw
- 23*a*: claw part
- 51: one end surface
- 51*a*: groove
- 51*b*: center hole
- 52: the other end surface
- 52*b*: center hole
- A: holding area

What is claimed is:

1. A material to be formed in a shape of column, to be worked by a working device that includes a face driver, a tailstock spindle and a tool bit, and to be worked in face driving with one end surface of the material in an axial direction held by the face driver having a center pin and a plurality of driving claws arranged around the center pin, comprising:
    a center hole into which the center pin is fit, and which is formed on the one end surface; and
    a recess or a protrusion formed to exist in every phase in a circumferential direction of the one end surface around the center hole, which is formed on the one end surface,
    wherein the driving claw is formed as a pillar,
    wherein a tip part of the claw has a pair of tapered surfaces next to each other toward the tip thereof,
    wherein a linear claw part is formed at the tip defined by the tapered surfaces,
    wherein the face driver holds the one end surface of the material in the axial direction thereof by driving the plurality of driving claws into the one end surface and by making the plurality of driving claws bite into the one end surface of the material,
    wherein the tailstock spindle supports the other end surface of the material in the axial direction thereof,
    wherein a tool bit is a cutting tool for turning the outer circumferential surface of the material,
    wherein the outer circumferential surface of the rotating material is turned by the tool bit while holding the one end surface of the material in the axial direction thereof with the face driver in the face driving, and
    wherein the recess or the protrusion is arranged within an area of the one end surface in a radial direction of the one end surface, into which the plurality of driving claws are driven.

2. The material according to claim 1, wherein
    the recess or the protrusion is formed to be situated, in at least a phase in the circumferential direction of the one end surface around the center hole, at a plurality of positions within the area of the one end surface in the radial direction of the one end surface, into which the plurality of driving claws are driven.

3. The material according to claim 1, wherein
    the recess is a groove extending in the circumferential direction of the one end surface around the center hole across the radial direction of the one end surface.

4. A method for working the material according to claim 1, comprising:
    holding the one end surface of the material with the face driver by fitting the center pin of the face driver into the center hole of the one end surface and by driving the plurality of driving claws of the face driver into the area of the one end surface;
    supporting the other end surface of the material with the tailstock spindle; and
    turning an outer circumferential surface of the material while rotating the material on an axis of the center pin with the face driver.

\* \* \* \* \*